(12) United States Patent
Lin

(10) Patent No.: US 6,836,975 B2
(45) Date of Patent: Jan. 4, 2005

(54) BRAKING STRUCTURE OF MEASURING TAPE

(75) Inventor: Henry Lin, Taipei (TW)

(73) Assignee: Index Measuring Tape Co., Ltd., Taipei (TW)

( * ) Notice: Subject to any disclaimer, the term of this patent is extended or adjusted under 35 U.S.C. 154(b) by 0 days.

(21) Appl. No.: 10/352,962

(22) Filed: Jan. 29, 2003

(65) Prior Publication Data
US 2004/0143986 A1 Jul. 29, 2004

(51) Int. Cl.[7] ............................................. G01B 3/10
(52) U.S. Cl. .................................... 33/767; 242/381.3
(58) Field of Search ......................... 33/767, 755, 769, 33/761; 242/381.5, 381.3, 381.6, 396.5, 396.6, 380, 381, 422.5, 422.4

(56) References Cited

U.S. PATENT DOCUMENTS

| | | | | |
|---|---|---|---|---|
| 2,055,281 A | * | 9/1936 | Dulczewski | 33/767 |
| 3,570,782 A | | 3/1971 | Hayes et al. | 242/107.2 |
| 3,582,592 A | * | 6/1971 | Schadow | 200/524 |
| 4,449,302 A | * | 5/1984 | Drechsler et al. | 33/767 |
| 4,489,494 A | * | 12/1984 | Duda | 33/767 |
| 4,663,854 A | | 5/1987 | Miller et al. | 33/138 |
| 4,927,092 A | * | 5/1990 | Ingram et al. | 242/381.3 |
| 4,998,356 A | | 3/1991 | Chapin | 33/767 |
| 5,001,843 A | | 3/1991 | Chapin | 33/767 |
| 5,395,069 A | * | 3/1995 | Chen | 242/381.3 |
| 5,400,521 A | * | 3/1995 | Waldherr | 33/767 |
| 5,423,494 A | * | 6/1995 | Kondo | 242/381.5 |
| 6,026,585 A | * | 2/2000 | Li | 33/767 |
| 6,085,433 A | | 7/2000 | Li | 33/767 |
| 6,276,071 B1 | | 8/2001 | Khachatoorian | 33/767 |
| 6,431,486 B1 | * | 8/2002 | Lee | 242/381.3 |

FOREIGN PATENT DOCUMENTS

JP          60135801 A   *  7/1985  ............ G01B/3/10

* cited by examiner

Primary Examiner—Diego Gutierrez
Assistant Examiner—Amy R. Cohen
(74) Attorney, Agent, or Firm—Troxell Law Office PLLC

(57) ABSTRACT

A breaking structure of measuring tape, including a housing, a tape rule contained in the housing and a braking mechanism, characterized in that: a push button is formed onto the housing, by pushing the push button into the housing to keep it at a lower position; a braking plate of the braking mechanism would effectively suspend the movement of the tape rule, and after that, if the push button is pushed downward again, the braking mechanism would push the push button upward and return to its higher position, and the braking plate of the braking mechanism would separate the tape rule and the movement of the tape rule would not be suspended.

10 Claims, 7 Drawing Sheets

BRAKING STRUCTURE OF MEASURING TAPE

BACKGROUND OF THE INVENTION

1. Field of the Invention

The present invention relates to a braking structure of measuring tape, especially to a braking mechanism by which the movement of the rule would be effectively suspended, and the braking function of measuring tape is easily to be withdrawn by simply pushing a control button.

2. Description of the Prior Art

As shown in FIG. 1A, the conventional measuring tape rule has a pushing key 101 above the housing 100, the pushing key 101 is connected with a pressing leg 102 which is put inside the housing 100. When the pushing key 101 is pushed downward by the user, the pressing 102 would slide downward and its lower end would press the upper surface of tape rule 103; then the movement of tape rule 103 is suspended (as shown in FIG. 1B.)

In using the above shown structure, since the movement of tape rule 103 is suspended when the pushing key 101 is pushed downward and the lower end of said pressing leg is pressed against the tipper surface of the tape rule 103, when the pushing force is withdrawn, the tape rule would be rewound back into the housing immediately. It is then inconvenient for people to use.

FIG. 1C shows another prior art of measuring tape invented by the inventor. It is characterized in that, a pushing key 201 can be installed onto an upper corner of the housing, said pushing key 201 can be rotated with a shaft 202 through the center of the lower end of said pushing key 201. Such that when one end of pushing key 201 is pushed downward, the pressing element 203 installed beneath the pushing key 201 would be pushed downward to press the tape rule 204, then if different end of the pushing key 201 is pressed, then the pressing force against tape rule is removed.

In using the measuring tape as shown in FIG. 1C, the movement of tape rule can be easily controlled. However, it is still necessary to install a pushing key onto the housing, then the beauty of a whole body and the comfort of holding the measuring tape are greatly reduced.

Furthermore, in order to suspend the movement of the tape rule, a pushing force which would overcome the force to rewind the tape rule should be performed. It is a hard work to people's thumb. Therefore, the conventional measuring tapes are not convenient for people's uses.

In addition, since the pushing key has to have the function of pushing the tape stopping element, the measuring tape together with its tape stopping element then has to occupy a relative volume to endure the stopping force performed onto the pushing key. It is then easy to cause injury to people.

In order to improve the aforementioned defects, the inventor of present invention has made a great effort and has made many novel designs.

SUMMARY OF THE INVENTION

Accordingly, the object of the present invention is to provide a braking structure of a measuring tape which is actuated by a push button set in an opening formed on the housing of the measuring tape and a braking mechanism installed inside the housing. When the push button is pushed to move up and down, the braking mechanism would be moved so as to stop or release the tape rule. Thus, the rule may conveniently and effectively be controlled.

A further object of the present invention is in that the push button can be easily pushed downward by a light force rather than by heavily pushing the conventional pushing key. It is then much easier and convenient to people.

The present invention will be better understood and its numerous objects and advantages will become apparent to those skilled in the art by referencing to the following drawings in which:

DETAILED DESCRIPTION OF THE PREFERRED EMBODIMENT

FIGS. 1A to 1D show the examples of conventional measuring tape; their functions and disadvantages are described as above; it is not repeated herewith.

Figure 1A:
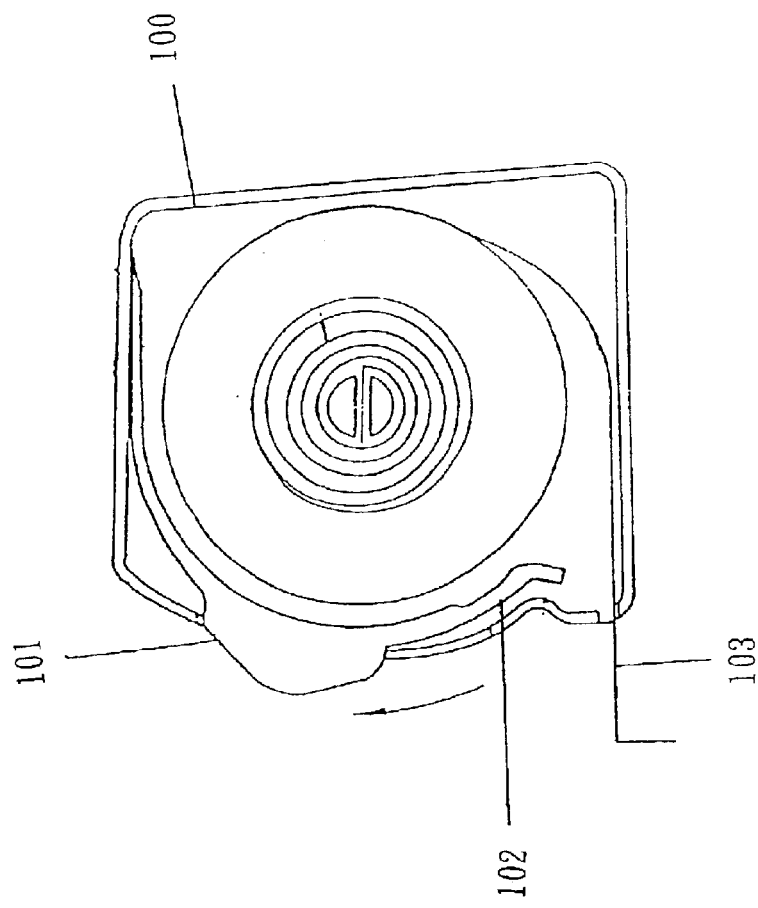
FIG. 1A is a cross-sectional view of a prior measuring tape.
Figure 1B:
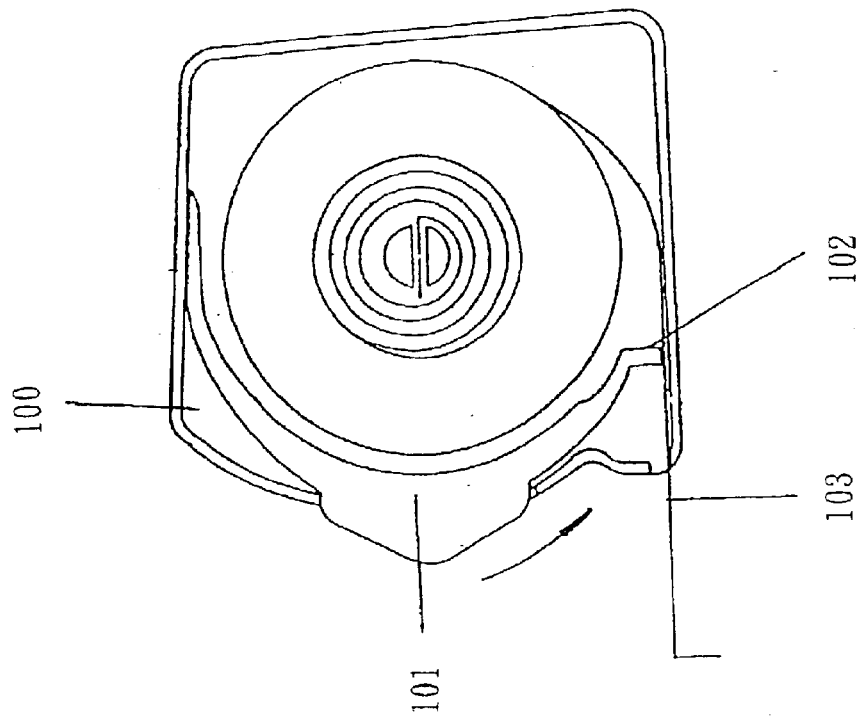
FIG. 1B is a cross-sectional view of a prior measuring tape of FIG. 1A in using.
Figures 1C, 1D:
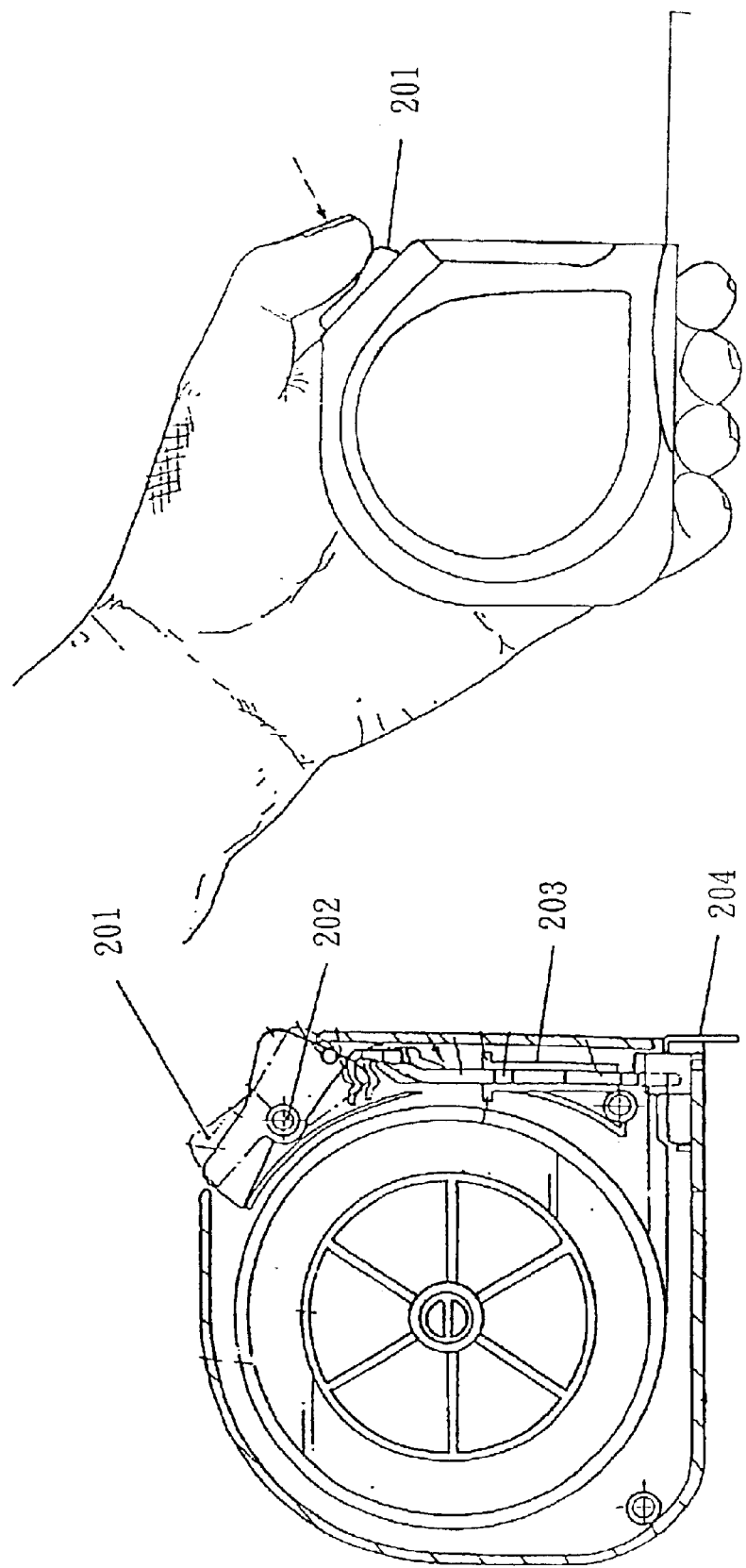
FIG. 1C is a cross-sectional view of another prior measuring tape.
FIG. 1D is a cross-sectional view of another prior measuring tape of FIG. 1C in using.
Figure 2:
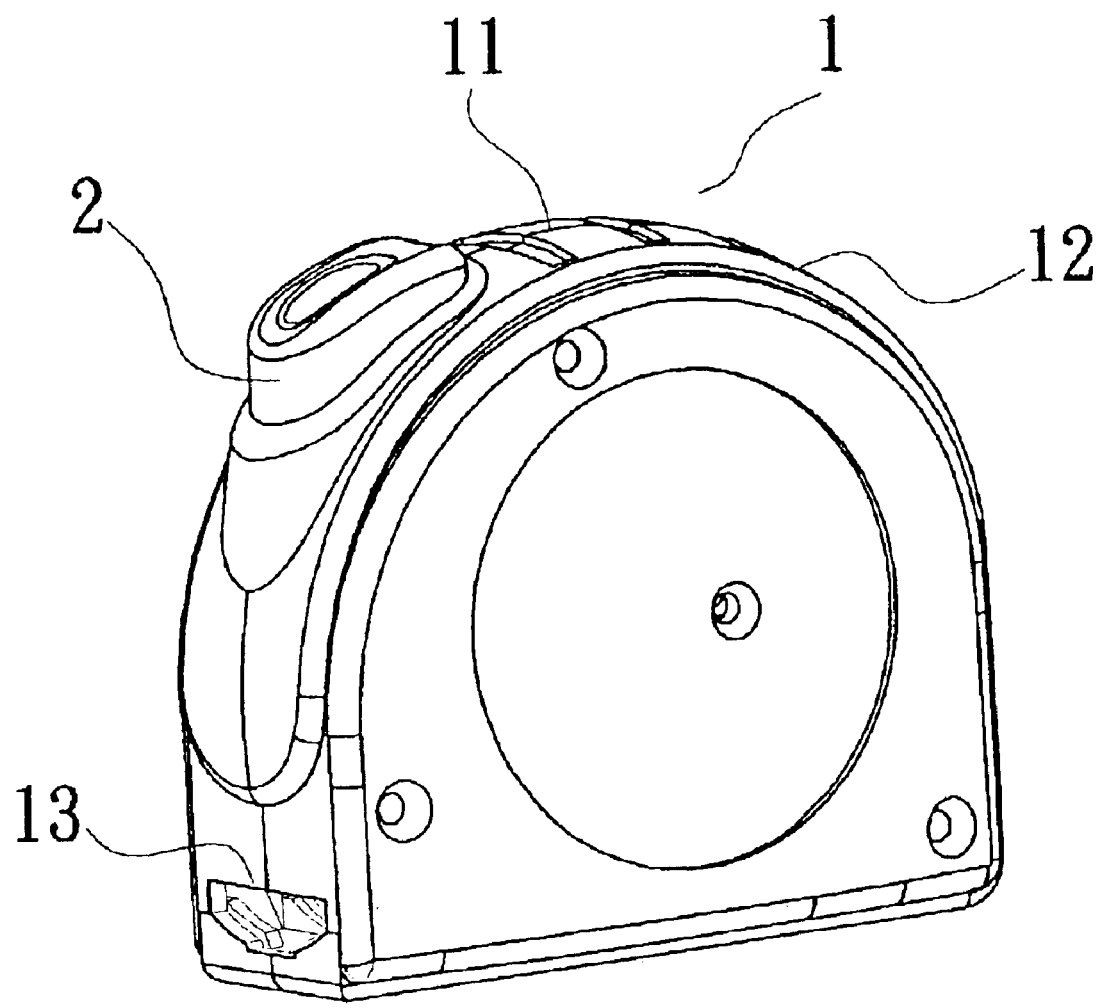
FIG. 2 is a perspective view of the present invention.

As shown in FIG. 2, the outer body of the measuring tape of present invention is composed by a housing 1 and a control button 2 is installed in an opening formed at the front upper portion of the housing 1, the housing 1 is constructed by a left housing 14 and a right housing 15 to screw together, and the housing is covered by a left housing sleeve 11 and a right housing sleeve 12; an opening 13 to be the exit of tape rule is also formed at the lower end of front side of the housing 11.

Figure 3:
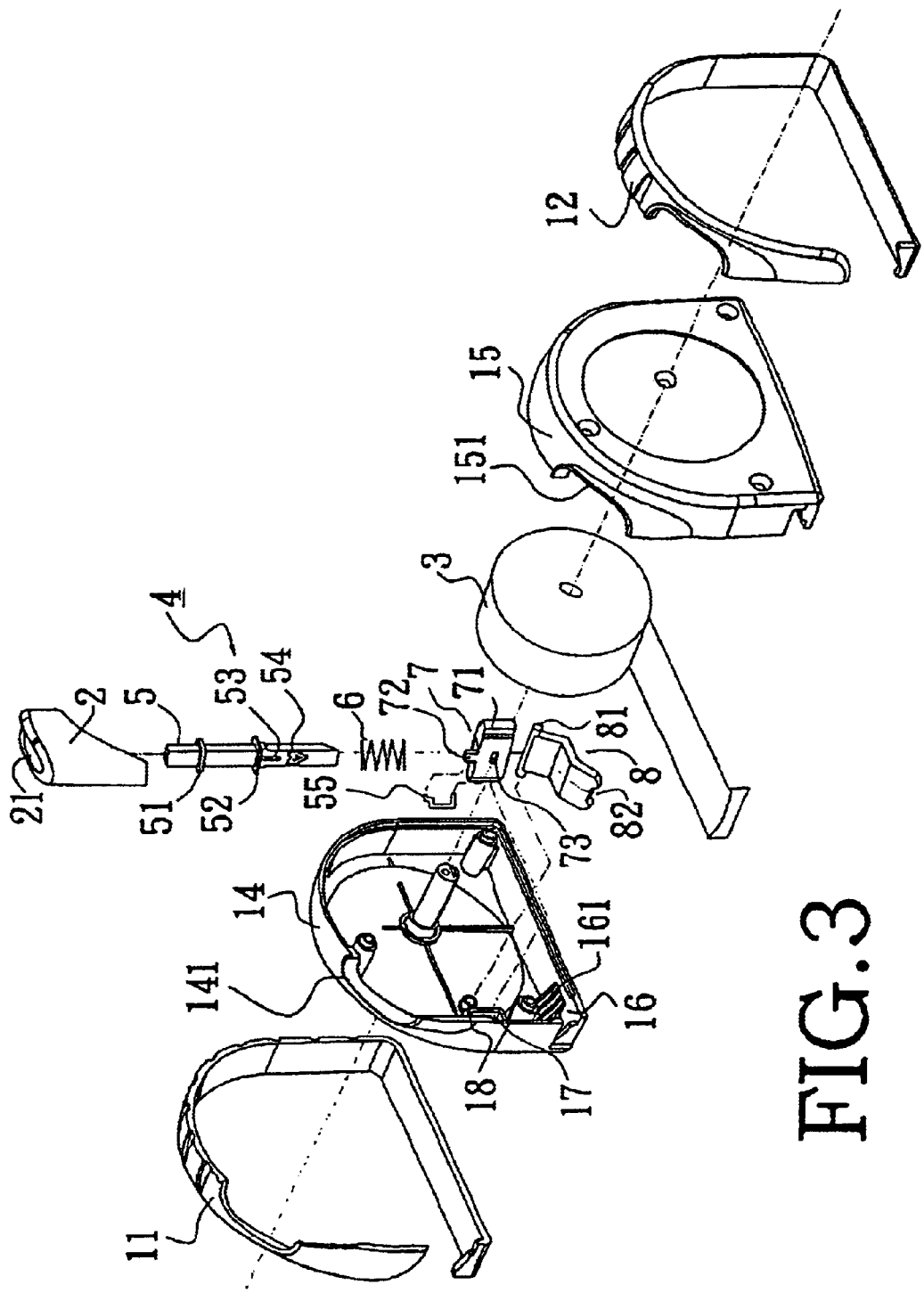
FIG. 3 is an exploded view showing the measuring tape according to the present invention.

As shown in FIG. 3, inside the housing 1, there is a tape rule 3 and a braking mechanism 4 is installed into a front space inside the housing 1. Said tape rule 3 is clamped by said left housing 14 and right housing 15, and the free end of tape rule 3 can slide through said tape rule exit 13; at the front lower portion on the left housing 14 and the right housing 15 near said tape rule exit 13, a semi-braking furrow 16 is respectively formed. Said semi-braking furrow 16 has a plurality of grooves 161, such that after said semi-braking furrow 16 is formed by combing the housings 14 & 15, the upper surface of said semi-braking furrow 16 is formed as a concave surface to meet the bottom surface of the tape rule. In addition, each of the upper corner of said housings 14 & 15 is formed respectively with a semi-arc opening 141 & 151, such that after said housings 14 & 15 is combined, an opening is formed by the two semi-arc openings 141 & 151 for said control button 2 to pass through. Said control button 2 formed in an irregular shape, its upper-end is a pressing portion 21, and its lower end is communicated to a braking mechanism 4.

Figure 4:
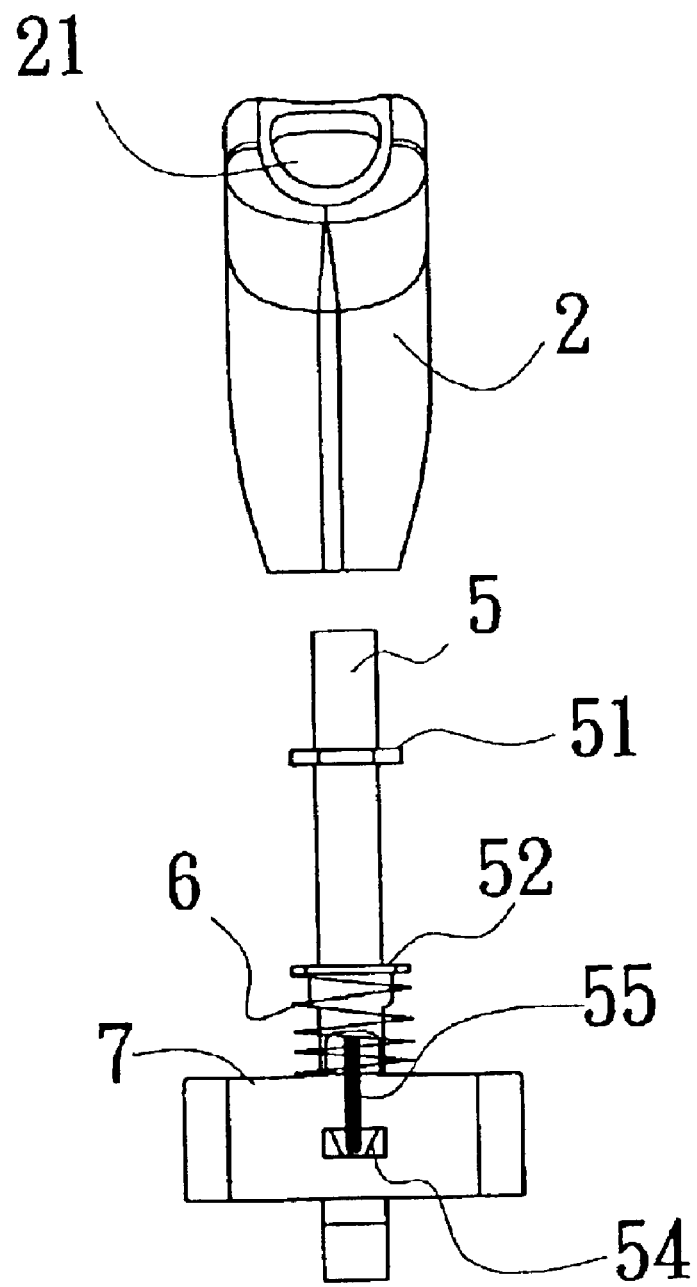
FIG. 4 is a plane view showing the braking mechanism of present invention.

Please refer to FIG. 3 and FIG. 4, the braking mechanism 4 is composed of a stem 5, a spring 6, a pressing seat 7 and a braking plate 8, wherein the stem 5 is a long strip body, an upper flange 51, a lower flange 52, a vertical long-shaped furrow 53 is formed on the body of the stem 5, and under the long-shaped furrow 53, a heart-shaped furrow 54 is formed. The upper flange 51 is used for supporting control button 2, the lower flange 52 is used for the spring 6 to put oil, the lower section of the stem 5 passes the vertical via the hole formed in the pressure seat 7 and then touches the braking plate 8. Said pressure seat 7 is positioned by two flanges 71 be extended into a pair of extended into a pair of mounting furrows 17 formed inside the housing. On the pressure seat 7, there are also an upper hole 72 and a lower hole 73. Between the said long-shaped furrow 53 and said heart-shaped furrow 54, there is a "⊏" shaped hook 55 with its two free ends respectively inserted into said long-shaped furrow 53 and said heart-shaped furrow 54. The upper section of hook 55 is held by the spring 6 mounted onto the stein 5, and the upper end of the spring 6 is stopped by said lower flange 52 formed on the stem 5. While the lower end of the spring 6 is stopped by the top surface of the pressure seat 7, the two free ends of said "⊏" shaped hook are also respectively inserted into the upper hole 72 and the lower hole 73 formed on the pressure seat 7.

The braking plate 8 contains a plurality of segments. Its upper edge extrudes a pair of ears 81 to be inserted into a pair of inserting holes 18 formed inside the housing 14 & 15. Such that the braking plate 8 can rotate with said ears 81 as rotation shaft. The central portion of said braking plate 8 is a slope plate 82. After combination, the lower end of said braking plate 8 is positioned above the tape rule, and near the upper front end of said two semi-braking furrows 16.

Figure 5:
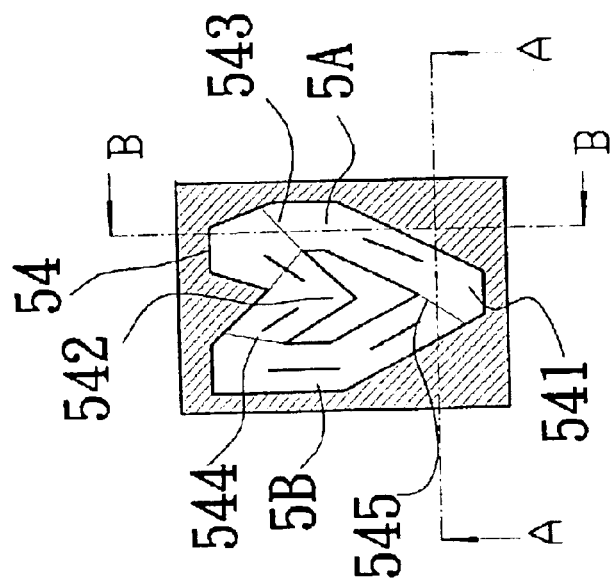
FIG. 5 is an enlarged plane view showing the heart-shaped furrow of present invention.
Figure 6:
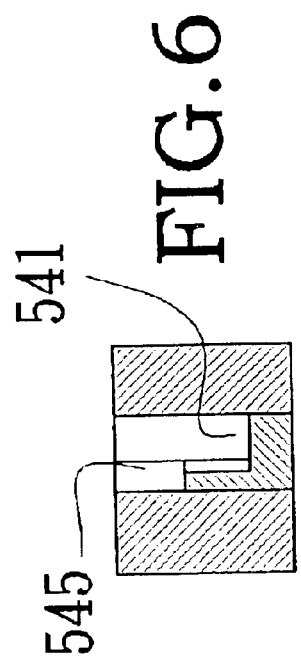
FIG. 6 is a cross-sectional view seeing from A—A line of FIG. 5 showing the heart-shaped furrow of present invention.
Figure 7:
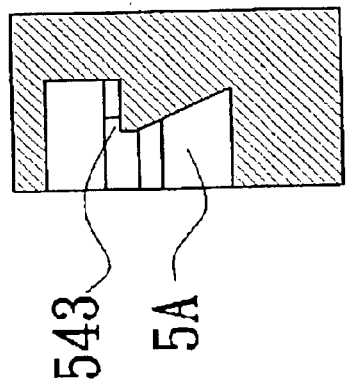
FIG. 7 is a cross-sectional view seeing from B—B line of FIG. 5 showing the heart-shaped furrow of present invention.

As shown in FIGS. 5, 6 & 7, said heart-shaped furrow 54 is formed as a guiding path, its lower stop point 541 and upper stop point 542 contain the deepest grooves, in the clockwise groove 5A and counter-clock groove 5B formed between the lower stop point 541 and upper stop 542. There are a plurality of ribs 543, 544, 545, such that the lower end of said hook 55 is moved only in counter-clock direction or clockwise direction, and stops at the lower stop point 541 or upper stop point 542 to determine the condition of braking.

Figure 8:
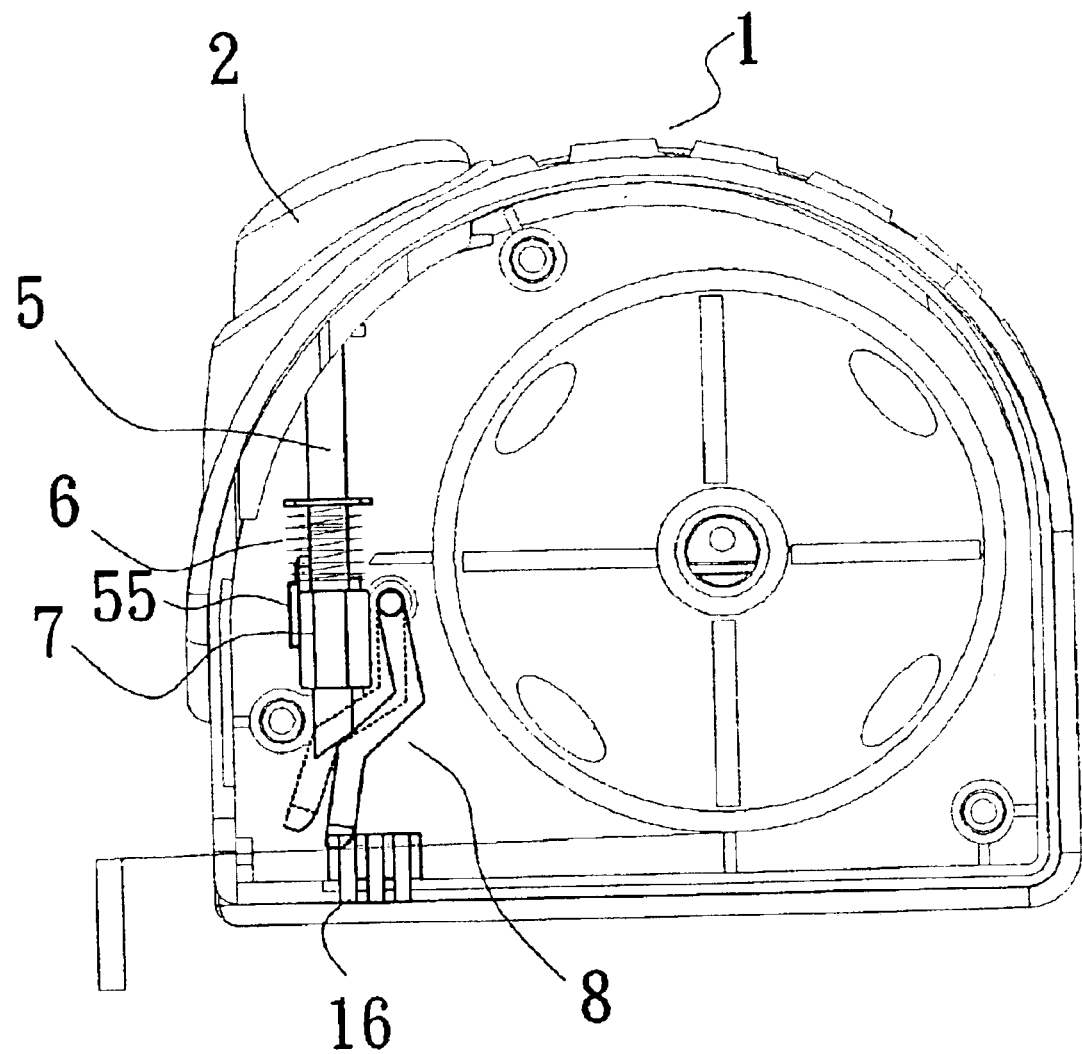
FIG. 8 is a side view showing the action of the braking mechanism of the present invention.

As shown in FIG. 8, when the control button 2 is pressed downward, the stem 5 then moves downward; when stem 5 moves downward; when the stem 5 moves downward, the spring 6 is then in a compressive condition and a rebound force is produced; at the same time, the lower end of the hook 55 would then follow clockwise groove 5A of the heart-shaped furrow 52 and move to position 541; and the stem 5 also reaches the lowest position, at the same time, the lower end of said stem pushes the braking plate 8, the braking plate 8 then rotates to make its lower end press the upper surface of tape rule, the tape rule is then bent downward into said semi braking furrow 16; after the control button 2 is released, the lower end of hook 55 then drops into said upper stop point 542 of said heart-shaped furrow 54 and fixed in the position. The pressing force onto the tape rule is slightly released. However, because the rebound force of spring 6, the lower end of braking plate 8 still presses the tape rule and the tape rule is still depressed against the semi braking furrow 16, the tape rule is temporarily stopped and its rewind speed is slowed.

When control button 2 is pressed downward again, the stem 5 is pressed downward again, the lower end of hook 55 moves counterclockwisely along the path of heart-shaped furrow 5B, when the stem 5 reaches the lowest position, the lower end of the hook 55 passes the rib 544, and after the control button 2 is released, the lower end of hook 55 then drops into the lower stop point 541.

In addition to the above braking action, control button 2 can be pressed to the lowest position and maintained at its lowest position, then the movement of tape rule is temporarily suspended.

It can be understood that, according to the construction of present application, the movement of tape rule can be suspended simply by pressing the control button 2 of the housing 1 to move downward, and the control button 2 of the housing 1 can be pressed downward by people's hand, or by people's thumb. It is then) an energy-saving measuring tape.

Accordingly, from the aforementioned description, the braking structure of measuring tape of present invention of the present invention certainly has the effect of sustaining the tape rule in a steady condition. Although the present invention has been described using a specified embodiment, the examples are meant to be illustrative and not restrictive. It is clear that many other variations would be possible without departing from the basic approach, demonstrated in the present invention.

What is claimed is:

1. A braking structure for a tape measure comprising:
    a) a housing having:
        i) a left housing piece having a first semi-arc opening and a first tape rule exit; and
        ii) a right housing piece connected to the left housing piece and having a second semi-arc opening and a second tape rule exit, the first and the second semi-arc half openings form a semi-arc opening when the left and right housing pieces are connected, the first and the second tape rule exit form a tape rule exit when the left and right housing pieces are connected;
    b) a tape rule having a first end connected between the first and second housing pieces and a second end movably extending through the tape rule exit;
    c) a braking mechanism slidably located in the housing and having:
        i) a stem having an upper flange and a lower flange;
        ii) a pressing seat connected to the housing and having a through hole, the stem inserted through the through hole;
        iii) a spring located between the lower flange and the pressing seat; and
        iv) a braking plate pivotally connected at a first end to the left and right housing pieces and engaging a top of the tape rule with a second end thereof; and
    d) a control button slidably located in the semi-arc opening and engaging the upper flange of the stem.

2. The braking structure according to claim 1, wherein the control button has a pressing portion on a top surface thereof.

3. The braking structure according to claim 1, wherein the stem includes a vertical long-shaped furrow and a heart-shaped furrow, the braking mechanism includes a U-shaped hook having a first hook end and a second hook end, the first hook end being inserted into the vertical long-shaped furrow, the second hook end being inserted into the heart-shaped furrow.

4. The braking structure according to claim 1, wherein the left housing piece has a left mounting furrow, the right housing piece has a right mounting furrow, the pressing seat having two flanges, one of the two flanges inserted into each of the left and the right mounting furrows.

5. The braking structure according to claim 1, wherein the stem includes a vertical long-shaped furrow and a heart-shaped furrow, the braking mechanism includes a U-shaped hook having a first hook end and a second hook end, the pressing seat includes an upper hole, and a lower hole, the first hook end of the U-shaped hook being inserted through the upper hole and into the vertical long-shaped furrow, the second hook end of the U-shaped hook being inserted through the lower hole and into the heart-shaped furrow.

6. The braking structure according to claim 1, wherein the braking plate includes a pair of ears, the left housing includes a left inserting hole, the right housing includes a right inserting hole, the pair of ears are pivotally inserted into the left and right inserting holes.

7. The braking structure according to claim 3, wherein the heart-shaped furrow includes a lower stop point, an upper stop point, and a plurality of ribs, the second hook end of the U-shaped hook is moves in one of a clockwise direction and a counter-clockwise direction and is releasably stopped at one of the lower stop point and the upper stop point by pressing the control button.

8. The braking structure according to claim 5, wherein the heart-shaped furrow includes a lower stop point, an upper stop point, and a plurality of ribs, the second hook end of the U-shaped hook is moves in one of a clockwise direction and a counter-clockwise direction and is releasably stopped at one of the lower stop point and the upper stop point by pressing the control button.

9. The braking structure according to claim 1, wherein the left housing piece includes a plurality of first grooves, the right housing piece includes a plurality of second grooves, the plurality of first and second grooves form a semi-braking furrow when the left and right housing pieces are connected, the tape rule being located between the semi-braking furrow and the braking plate.

10. The braking structure according to claim 1, wherein the left housing piece includes a left housing sleeve, and the right housing piece includes a right housing sleeve.

* * * * *